United States Patent [19]
Kuntze et al.

[11] Patent Number: 5,199,664
[45] Date of Patent: Apr. 6, 1993

[54] FISHING REEL WITH SPOOL AND ADJUSTABLE BRAKE

[75] Inventors: Rupert Kuntze, Grafensteinberg; Gerhard Gruber, Meinheim, both of Fed. Rep. of Germany

[73] Assignee: D.A.M. Deutsch Angelgerate Manufaktur Hellmuth Kuntze GmbH & Co. KG, Fed. Rep. of Germany

[21] Appl. No.: 653,162

[22] Filed: Feb. 11, 1991

[30] Foreign Application Priority Data

Feb. 12, 1990 [DE] Fed. Rep. of Germany ....... 4004244

[51] Int. Cl.$^5$ ..................... A01K 89/01; A01K 89/027
[52] U.S. Cl. .................................... 242/228; 242/245; 242/246
[58] Field of Search ................ 242/244, 245, 246, 228, 242/227

[56] References Cited

U.S. PATENT DOCUMENTS

| | | | |
|---|---|---|---|
| 2,865,662 | 12/1958 | Nurmse | 287/53 |
| 3,946,963 | 3/1976 | Oberg | 242/84.21 |
| 4,249,706 | 2/1981 | Haselbauer et al. | 242/84.21 |
| 4,601,437 | 7/1986 | Yoshikawa | 242/245 |
| 4,702,431 | 10/1987 | Kaneko | 242/246 |
| 4,746,077 | 5/1988 | Toda | 242/245 |
| 4,749,285 | 6/1988 | Noda | 242/244 |
| 4,830,307 | 5/1989 | Lassi et al. | 242/84.5 A |
| 4,834,307 | 5/1989 | Larsson et al. | 242/245 |
| 4,848,696 | 7/1989 | Patterson | 242/246 |
| 4,938,433 | 7/1990 | Toda | 242/245 |

FOREIGN PATENT DOCUMENTS

| | | |
|---|---|---|
| 0406898A1 | 1/1991 | European Pat. Off. . |
| 0412918A1 | 2/1991 | European Pat. Off. . |
| 3024854 | 2/1981 | Fed. Rep. of Germany . |
| 8631555 | 6/1987 | Fed. Rep. of Germany . |
| 2205721 | 12/1988 | United Kingdom . |

OTHER PUBLICATIONS

Advertisement. Blinker Dec. 1986, p. 17.

*Primary Examiner*—Daniel P. Stodola
*Assistant Examiner*—William Stryjewski
*Attorney, Agent, or Firm*—Bacon & Thomas

[57] ABSTRACT

A fishing reel having a drag brake is disclosed which has a line receiving spool which is allowed to run free when the drag brake is disengaged. The drag brake is located at an opposite end of the fishing reel housing from the spool and acts on a spindle of the spool at that point. In the vicinity of the spool, a disengageable connection is provided for connecting the spool to a spindle of the fishing reel. The clutch is engaged by rotation of a driving handle. Further provided is an over-run brake located in the vicinity of the spool which acts between the spool and the spindle only upon relative rotation of the spool with respect to the spindle when the drag brake is disengaged. Further included are push rods which, upon displacement, causes disengagement of the spool from the spindle and pawls, carried by a ring surrounding the spindle, which may engage various spaced teeth formed integral with a bush fixed to a rotor of the fishing reel. The push rods and pawls are arranged such that when the push rods are not displaced, locking pins engage the ring and extend through openings in the pawls and when said push rods are displaced, the locking pins are retracted from the openings thereby defining locked and unlocked conditions of the spool with respect to the spindle.

13 Claims, 5 Drawing Sheets

FISHING REEL WITH SPOOL AND ADJUSTABLE BRAKE

FIELD OF THE INVENTION

The invention relates to a fishing reel having a line receiving spool with an adjustable drag brake and with means for allowing the spool to run free with the action of the drag brake disengaged. The drag brake is located at the opposite end of the fishing reel housing from the spool and acts on the spindle of the spool at that point, along with an over-run brake.

BACKGROUND OF THE INVENTION

Fishing reels of this kind are known from U.S. Pat. No. 4,830,307. In this arrangement the free-running of the spool is achieved by disengaging a spindle, which carries the spool, from a drag brake through a clutch. This is complicated in construction and accordingly expensive to manufacture, as well as difficult to service. In particular, it is a drawback that such existing available well-tried fishing reel constructions fail to provide a compact fishing reel with an over-run brake and an easily operated spool release mechanism.

A similar fishing reel construction is known from U.S. Pat. No. 4,746,077. This fishing reel is likewise provided with two brakes. In this arrangement the brake, which offers an opposing braking force to the line when a bite is obtained and a fish pulls on the line, is provided in the spool. On the other hand, the further brake, which is intended to stop over-running of the spool on release and thereby to prevent unwanted unwinding of the line from the spool, is in the rear end of the reel. Such an arrangement has the substantial drawback that all the means for achieving the free-running must be provided in the housing of the fishing reel. Bound up with this are similar drawbacks to those already mentioned above.

SUMMARY OF THE INVENTION

The aim of the invention lies in constructing a fishing reel having a conventional drag brake which avoids major and complicated re-design work and which includes an easily operated release of a spool for free-running operation.

According to the invention, the above problems are alleviated by providing a fishing reel having a disengageable connection between its spool and spindle. A release is located in the vicinity of the spool for disengaging this connection and allowing the spool to run free. A clutch, located in the vicinity of the spool, is provided for connecting the spool to its spindle and is engaged by rotating a driving handle. Furthermore, an over-run brake of the spool is provided between the spool and its spindle and functions only upon relative rotation (free-wheeling) of the spool with respect to the spindle.

In contrast to the state of the art according to U.S. Pat. No. 4,830,307 discussed above, the present invention provides for free-running of the spool by means which are all present in the vicinity of the spool. This alleviates the need for complicated modifications to the drag brake. Furthermore, the region of the fishing reel present between the drag brake and the spool, in particular the housing of the fishing reel, does not require inconvenient and complicated constructional changes. In particular, due to a compact design, the advantages of the present invention can basically be introduced without any modification to existing fishing reel housings and available drag brakes. In this way substantial costs on tooling are save. The reel housing of the present invention can be made smaller by contrast to the prior art as represented by U.S. Pat. No. 4,830,307 wherein two brakes are provided in the same region of the rear end region of the fishing reel which leads to a complicated, expensive and space-consuming construction.

The present invention allows the use of fishing reels of different constructions, in so far as they have only one drag brake and this brake can be clutched to the spool. These different fishing reels can be equipped with the same spool which is provided with the free running arrangement. In this connection, it is assumed that the spool is matched to the size of the fishing reel.

The arrangement of the over-run brake between the spool and its spindle of the present invention, with the over-run brake only being effective on relative rotation (free running) of the spool with respect of the spindle, is substantially simpler than the complicated constructions of the cited state of the art. In particular, despite the presence of such an over-run brake, it is possible, using the invention, to have all the relevant components at the front of the fishing reel in the vicinity of the spool so that the reel housings of different constructions can be provided with spools having both free-running and braking systems. Unwanted and uncontrolled unwinding of the line from the spool, which arises on free-running of the spool and its continued rotation because of its rotating inertial mass, is avoided by simple means. This is important as such unwanted unwinding of the line leads to snagging and tangling of the line and, above all, it can only be disentangled with a substantial outlay in time and a lot of care.

It is a particular advantage of the invention that, on the one hand, these drawbacks are overcome by means of the over-run brake and, on the other hand, the constructional outlay involved of this over-run brake is significantly less than in the state of the art. However, the over-run brake only takes up its function when the drag brake (main brake) is disengaged, i.e. the spool is free-running. By contrast, when the drag brake (main brake) is engaged in order to brake the spool, the over-run brake is out of action.

In an embodiment of the invention, displacement of a push rod causes the spool to be declutched from its spindle. The rod is also effective as a stop which locks the spool in this declutched condition as long as desired. The preferred declutching of the free-running state and coupling of the spool onto its spindle according to the invention is substantially simpler and more advantageous than in the above-mentioned state of the art.

With regard to further advantages and features of the invention, attention is expressly drawn to the following description and accompanying drawings of a preferred embodiment of the invention.

BRIEF DESCRIPTION OF THE INVENTION

DETAILED DESCRIPTION OF THE INVENTION

Figure 1:
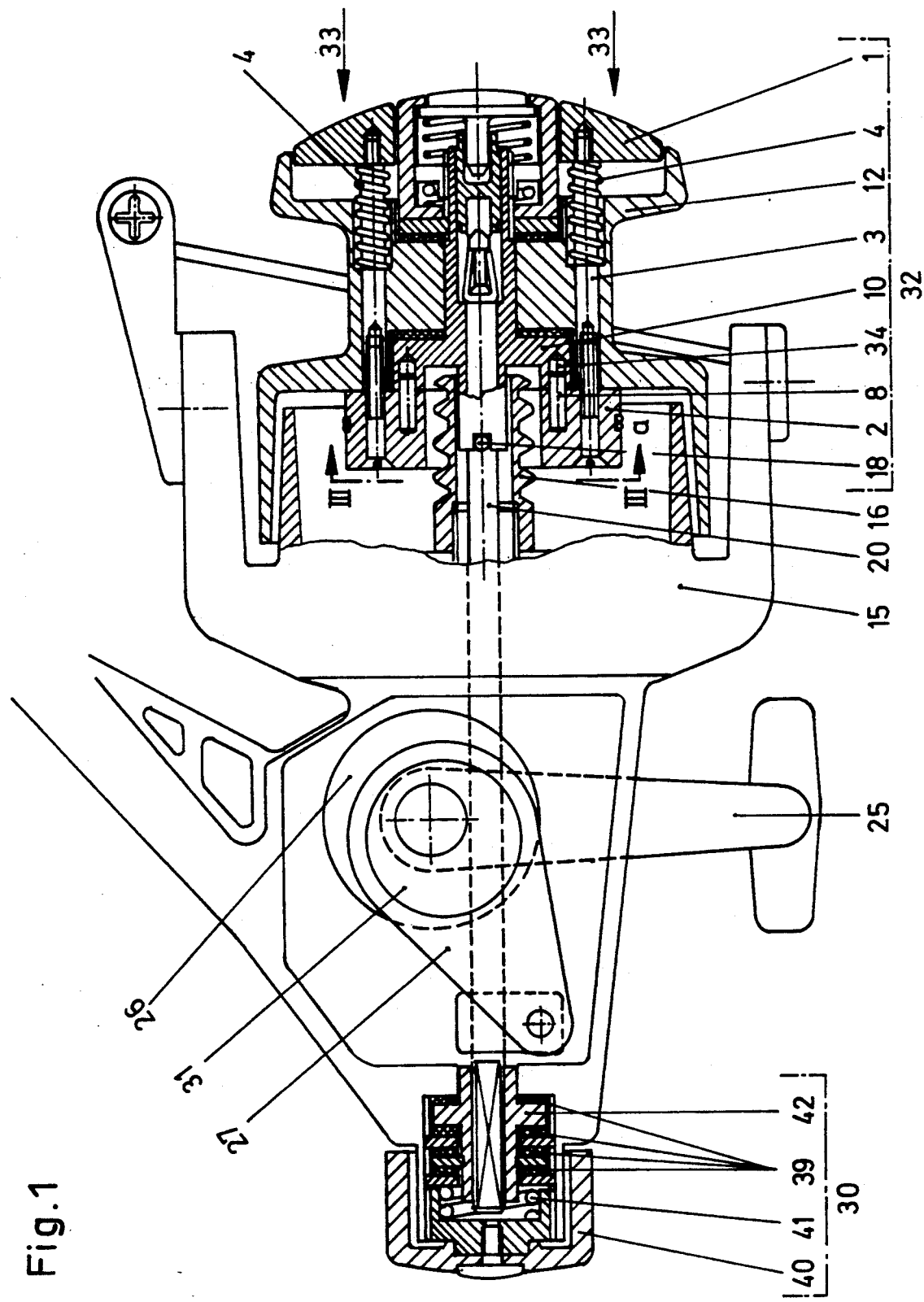
FIG. 1 is a side view of a fishing reel according to the invention with the spool free-running being disengaged, i.e. the spool being clutched to its drive.
Figure 5:
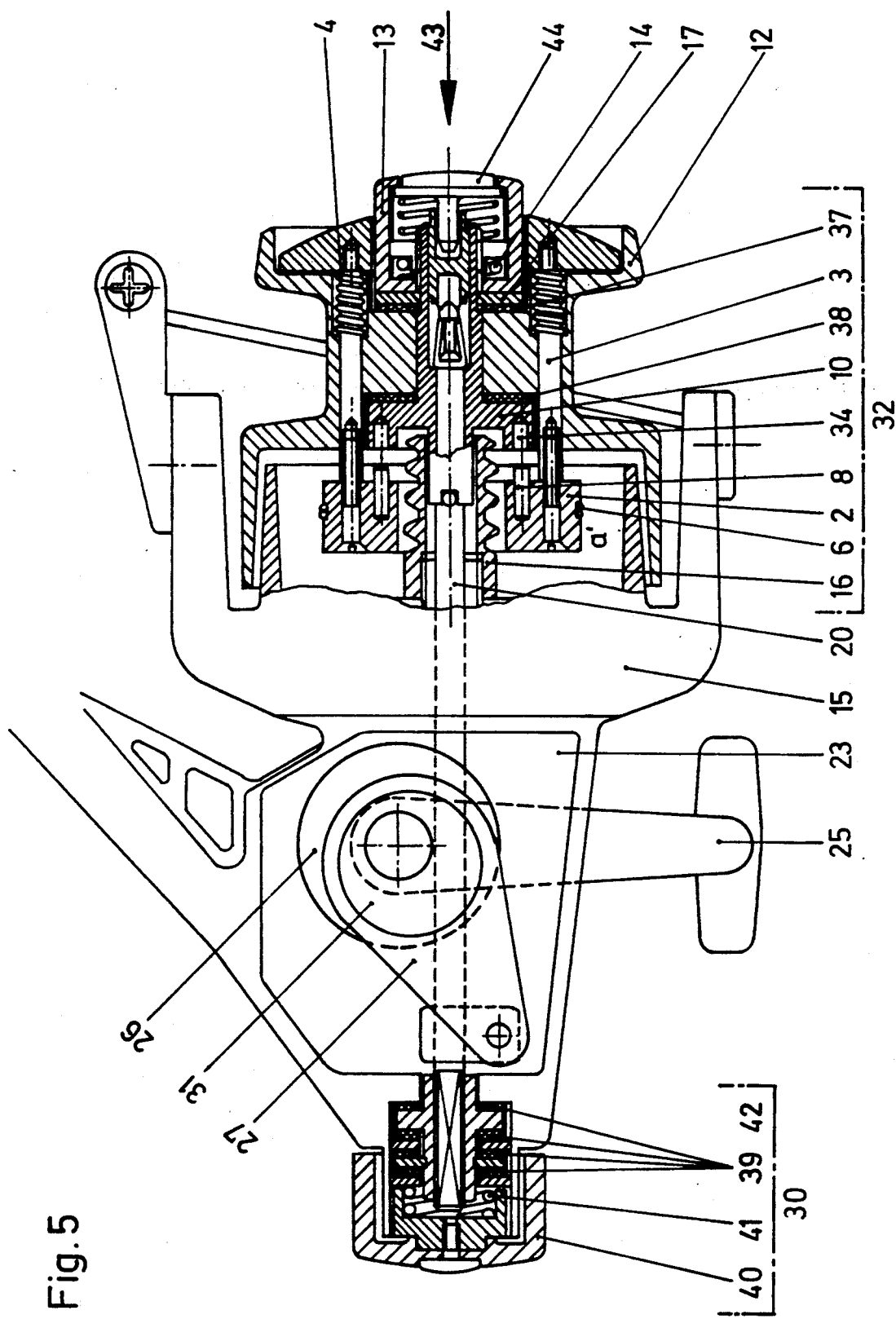
FIG. 5 is an illustration of the fishing reel corresponding to FIG. 1, but with the free-running engaged.

FIGS. 1 and 5 show the complete fishing reel of the present invention with rotor 15, spindle 20, housing 23, driving handle 25, drive wheel 26 with eccentric 31, associated guide fork 27, rear-mounted drag brake 30 and the spool region generally indicated at 32 each of which will be more fully described below.

Figure 2:
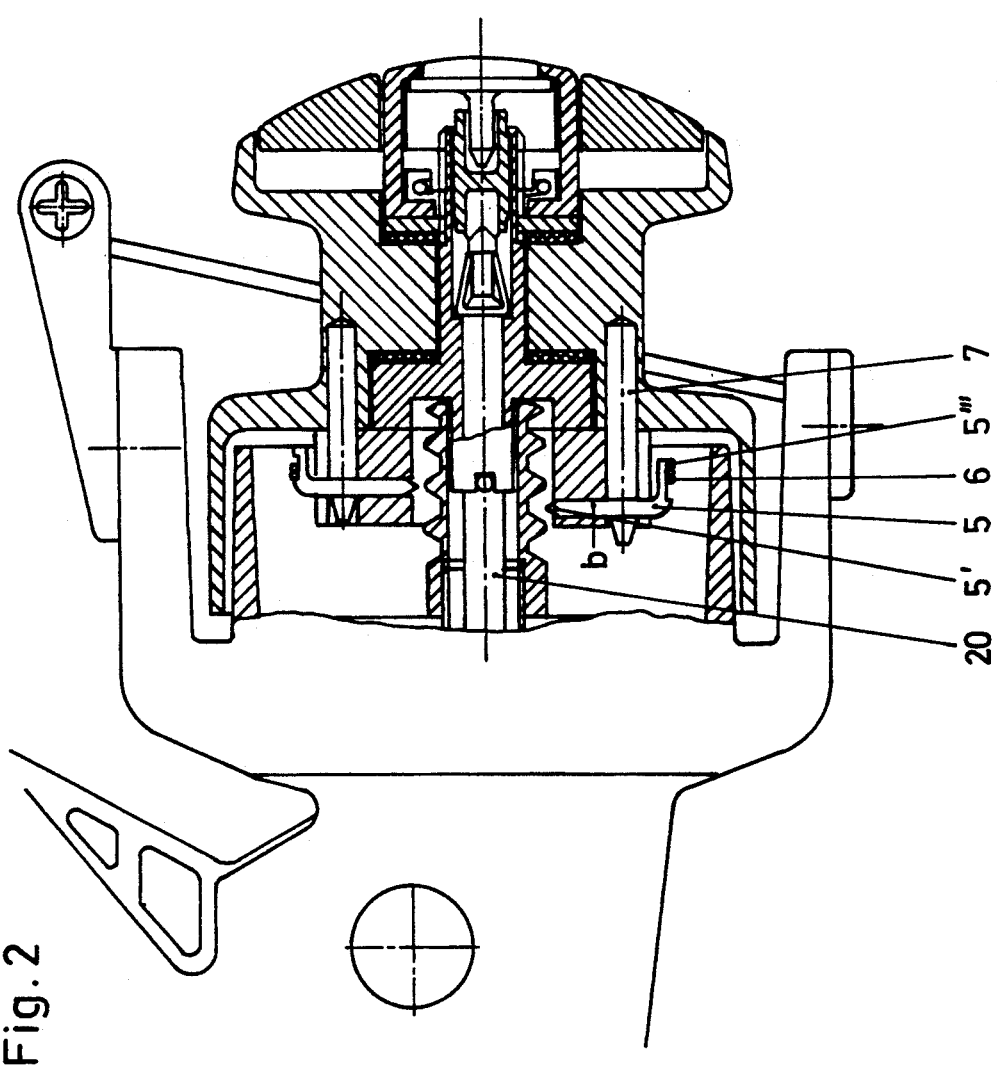
FIG. 2 shows the right-hand part of the fishing reel of FIG. 1.

As shown best in FIGS. 1 and 5, a spool 12 encloses a detent wheel 10 and is rotatable with respect to it. However, in the condition shown in FIG. 1, spool 12 is connected to the detent wheel 10 so as to rotate with it, this being by means of drivers 8 in the form of pins extending in the direction of the longitudinal axis of the spool 12. These drivers 8 are secured in a ring 2 which can be displaced by means of push rods 3 from the position a shown in FIGS. 1 and 2 into the position a shown in FIGS. 4 and 5. This is achieved by pressure on a ring-shaped release knob 1 in the direction of the arrows 33, compressing return springs 4. As soon as the drivers 8 have consequently withdrawn from blind holes 34 in the detent wheel, the spool 12 is in the free-running state.

Figure 3:
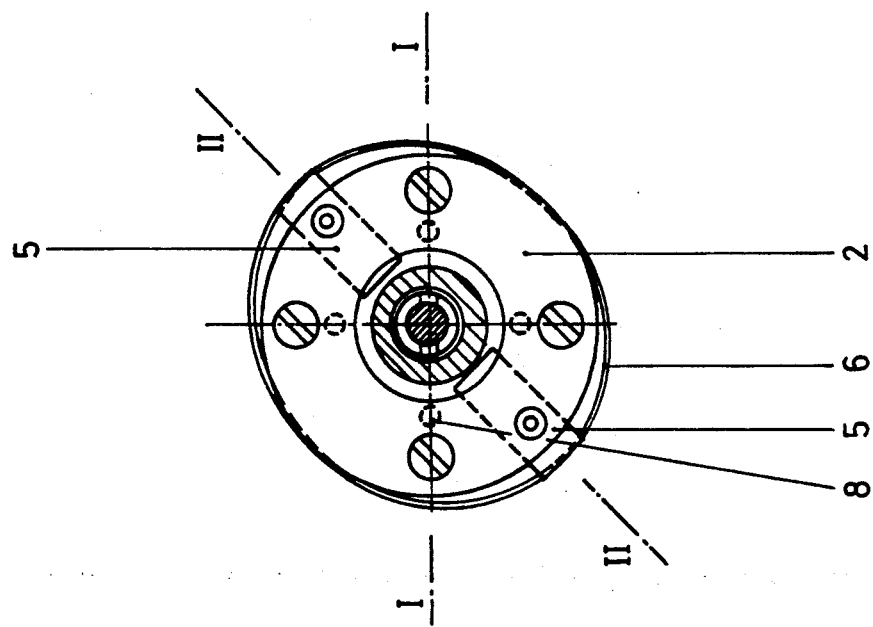
FIG. 3 is a partial section taken along line III—III in FIG. 1.

Provided in the ring 2 are radially directed pawls 5 which, in the preferred embodiment, are comprised of small sheet metal components (see FIG. 3). At their inner ends, pawls 5 terminate in conically tapering tips or points 5'. In the position shown in FIGS. 1 and 2, i.e. with the free-running disengaged, the pawls 5 are retained by locking pins 7 which have their tips extending through openings 5" in the pawls. In this condition, a ring spring 6, which engages bent-over outer ends 5'" of the pawls 5, is under stress. The displacement of the ring 2 in the direction 33 by actuation of the release knob 1 furthermore causes the openings 5" to slide clear of the locking pins 7 (see FIG. 4) and thereby to release the pawls 5. Due to this spring 6, the tapered points 5' of the pawls engage correspondingly shaped external teeth 35. In this way, the ring 2 is held in its position shown in FIGS. 4 and 5 by the detent elements 5, i.e. the spool 12 can rotate freely.

Figure 4:
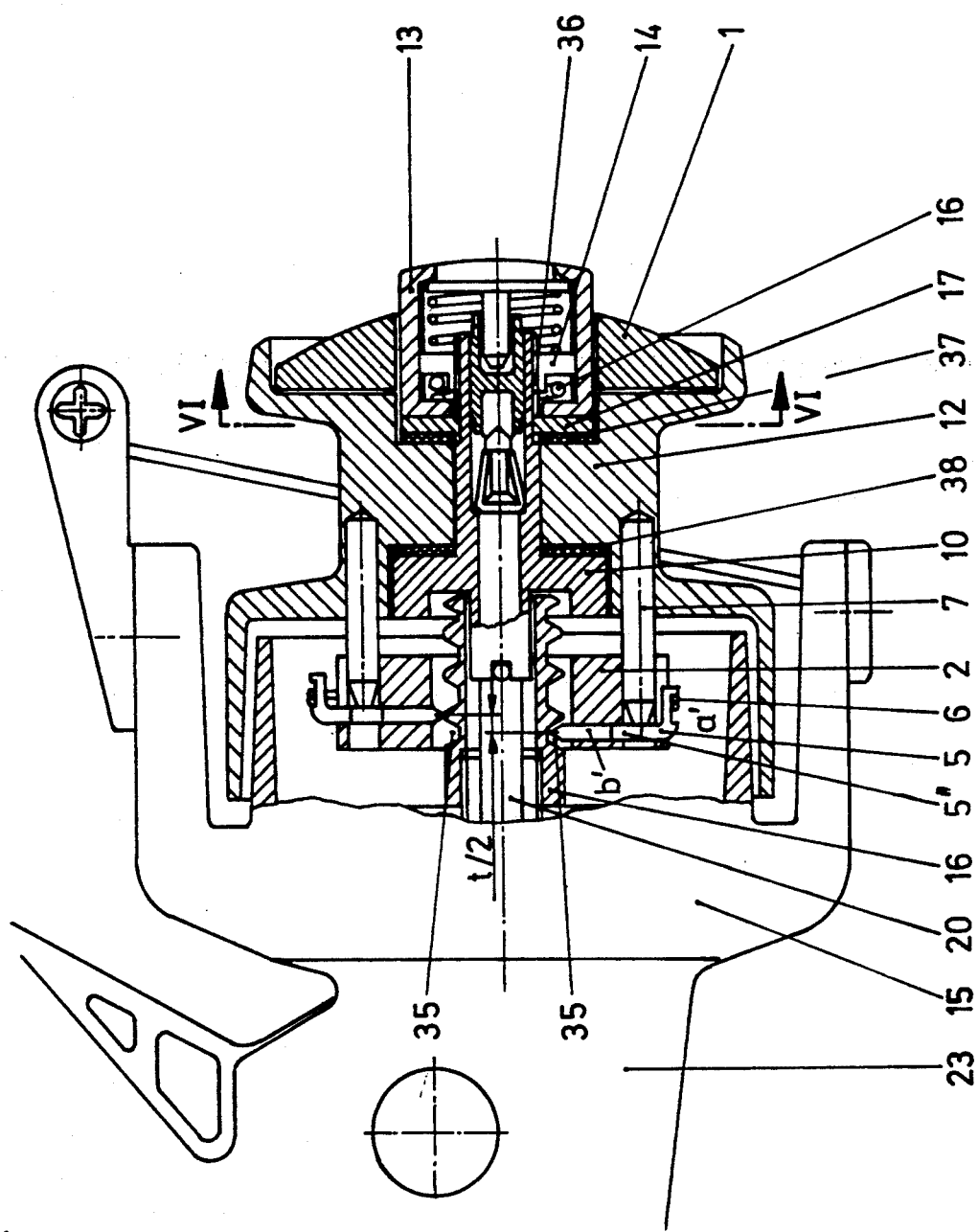
FIG. 4 is an illustration similar to FIG. 2 but with the spool free-running engaged.

In order to ensure that at least one of the pawls 5 engages in a gap in the external row of teeth 35 on a bush 16, at least one of the pawls 5 is offset with respect to another pawl 5 in the axial direction of the spindle 20 through the distance of half a tooth t/2 (see FIG. 4). Teeth 35, in the preferred embodiment, are formed integral with bush 16 which, in turn, is mounted on rotor 15. This mounting can be achieved in various ways known in the art such as by screwing onto a screw thread on the rotor.

Displaceable with respect to the rotor 15 and the bush 16 is spindle 20 of the spool 12. Spindle 20 is displaceable in the direction of its length. A return movement of the ring 2 from the position shown in FIGS. 4 and 5 to the position shown in FIGS. 1 and 2 by means of the return springs 4 is only possible when the pawls 5 have moved radially outwards again so that their tips 5' are no longer present between the teeth 35 and so that the locking, present up until then, of the ring 2 is released. Further details of this process will be discussed more fully herein.

Figure 6:
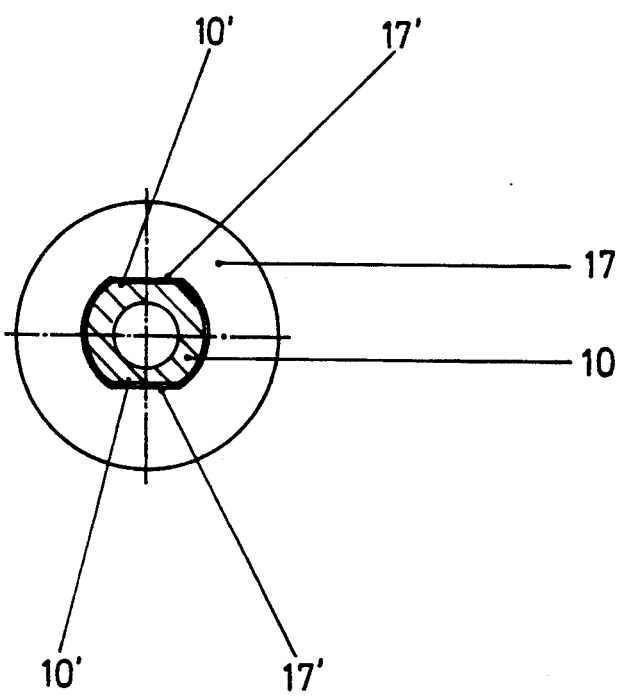
FIG. 6 depicts a cross-sectional view taken along line VI—VI in FIG. 4 showing an interposed disc and a detent wheel of the present invention.

In the free-running condition, the spool 12 with the ring 2, the ring-shaped release knob 1 and parts of an additional brake to be described later can rotate freely around the detent wheel 10 and thereby around the spindle 20 of the spool (FIGS. 4 and 5). In order to brake this rotary movement there is provided an over-run brake in the form of an adjustable nut 13. Thread 36 of nut 13 engages a matching screw thread on detent wheel 10. Rotation of nut 13 causes it to move axially, i.e. in the direction of the length of the spindle 20 of the spool 12. This causes a frictional force of greater or lesser magnitude on two brake discs 37, 38 which are present between the two faces of the spool 12 and opposing faces of the detent wheel 10 and of an intermediate disc 17 keyed to the detent wheel 10. For this purpose, the intermediate disc 17 has flats 17' in its bore engaging corresponding opposing surfaces 10' of the detent wheel 10 (see FIG. 6). From the foregoing it will be evident that the adjusting nut 13 with its counter-pressure spring 16 does not share in the free-running rotary movement of the spool 12. If desired, the nut 13 can also be loosened so far that there is no braking force at all on the friction surfaces 37, 38.

FIGS. 1 and 5 show further the drag brake (main brake) 30 which comprises a number of friction plates 39, a further adjusting nut 40 and a spring 41. According to the position of the nut 40, a greater or lesser degree of frictional force is exerted on rotating brake member 42 on the spindle 20 of the spool 12. As long as the spool 12 is not switched to the free-running condition (see FIG. 1), this braking force is transmitted through the spindle 20 to the spool 12. In this condition of operation, the over-run brake is inoperative. In order to change from the free-running condition shown in FIGS. 4 and 5 to a condition wherein the spool 12 is coupled to the spindle 20 to rotate therewith (FIGS. 1 and 2), rotary movement of a handle 25 is employed. Handle 25 acts through the eccentric 31 and the guide fork 27 to displace the spindle 20 axially through its travel to the right or left.

The foregoing explanations show that this free-running system with an over-run brake has been incorporated in the vicinity of the spool 12 without having to take up a significant amount of space. The above-mentioned cyclical back and forth displacement of the spindle is necessary in order, upon winding of the line, to be able to place it on the spool uniformly. The above-mentioned travel of the spindle 20 causes disengagement of the spool 12, which is provided with its free-running means and so on in the above-mentioned region 32. The above-mentioned displacement movement (travel) of the spindle 20 has to be large enough so that it brings the pawls 5 from the position b' to the position b (see FIGS. 2 and 4).

In the present embodiment, by way of example, the amount of this longitudinal displacement of the spindle is equal to or somewhat greater than t/2, being the pitch of the teeth 35. By this movement the components, 10, 12, 7, 2, 5 are displaced in the same manner since they are connected or keyed to the spindle 20. By the conical tapering of the tips 5' of the pawls 5 and the corresponding inclination of the teeth 35, the pawls 5 are urged radially outwards and their openings 5" come into line with the locking pins 7, which can then be urged into them by the force of the return springs 4. The pre-loading of the return springs 4, as mentioned above, also function to bring the ring 2 from the position a' to the position a wherein the drivers 8 enter the blind holes 34 in the detent wheel 20, and the spool 12 is once again mechanically connected through the components 7, 2, 8, 10, and 18 to the spindle 20 to rotate with it. The foregoing mechanical connection, indicated by the reference numeral 18, between the spindle 20 and the detent wheel 10 is known in the art and permits the spool 12 to be disconnected from spindle 20 by applying pressure in the direction of the arrow 43 (see FIGS. 1 and 5) on the central knob 44 and withdrawing spool 12 from the spindle 20. As explained, as soon as the spool 12 is connected to the spindle 20 to rotate with it, the drag brake 30 can accordingly act again on the spool 12 as explained earlier.

It is understood that the form of the invention herein before described is to be taken as a preferred embodiment of the invention and that various changes may be made thereto without departing from the spirit of the invention as defined by the scope of the following claims.

We claim:

1. A fishing reel comprising:
    a housing having first and second longitudinally spaced ends;
    a spindle extending longitudinally from the first end of said housing to the second end thereof;
    a driving handle for rotating said spindle relative to said housing;
    a spool rotatably mounted at the second end of said housing, said spool being adapted to receive a fishing line;
    means for drivingly coupling said spindle to said spool;
    an adjustable drag brake carried by the first end of said housing, said drag brake acting between said spindle and said housing to adjustable control the braking force acting on said spindle;
    releasing means for selectively disengaging said means for drivingly coupling said spindle to said spool such that said spool is permitted to rotate with respect to said spindle; and
    an over-run brake being located at the second end of said housing and acting between said spool and said spindle to brake said spool when said releasing means disengages said means for drivingly coupling said spindle to said spool, whereby when the drive coupling between said spindle and said spool is disengaged by said releasing means and said spool is permitted to rotate relative to said spindle under the braking action of said over-run brake, actuation of said driving handle cause said spindle to rotate and said means for drivingly coupling said spindle to said spool to become automatically re-engaged.

2. A fishing reel according to claim 1, wherein said releasing means comprises a plurality of push rods which are displaceable in the longitudinal direction of said spindle to disengage said spool from said spindle, a release member for causing displacement of said push rods, and means for holding said spool in a disengaged position, the displacement of said push rods causing both disengagement of said spool from said spindle and actuation of said means for holding said spool in this disengaged position.

3. A fishing reel according to claim 2, wherein said means for drivingly coupling said spindle to said spool comprises a ring which surrounds said spindle and is displaceable in the longitudinal direction of said spindle, a detent wheel secured to said spindle, and drivers, carried by said ring, which, when said push rods are not displaced, engage in holes in said detent wheel to drivingly couple said spindle to said spool, said push rods being adapted to engage said ring in order to shift said ring in the longitudinal direction of said spindle to displace said drivers from the holes in said detent wheel to disengage said spool from said spindle.

4. A fishing reel according to claim 3, wherein said over-run brake includes an adjustable nut having a threaded portion engaging a corresponding threaded portion on said spindle and that the adjustable nut, according to its position, sets the engaging force on brake pads located and acting between said spool and said spindle.

5. A fishing reel according to claim 3, wherein said over-run brake includes an adjustable nut having a threaded portion engaging a corresponding threaded portion on said detent wheel and that the adjustable nut, according to its position, sets the engaging force on brake pads located and acting between said spool and said detent wheel.

6. A fishing reel according to claim 3, wherein said drivers and the holes in said detent wheel extend in the longitudinal direction of said spindle and accordingly in the direction of displacement of said push rods and of said ring.

7. A fishing reel according to any one of claim 2, 3 or 6, further including pawls carried by said ring; a rotor surrounding a portion of said spindle; and a bush fixed to said rotor, said bush including various spaced teeth, said pawls being displaceable in a radial direction of said fishing reel into or out of engagement with said teeth.

8. A fishing reel according to claim 7, wherein said pawls include openings therein and are biased radially inward by spring means and said fishing reel further includes locking pins mounted in said spool, said locking pins extending in the direction of displacement of said push rods and, when said push rods are not displaced, said locking pins engage said ring and extend through the openings in said pawls, and when said push rods and said rings are displaced, said locking pins are no longer in engagement with the openings in said pawls.

9. A fishing reel according to claim 7, wherein said pawls include inner radial ends which taper conically and said teeth on said bush include flanks which are also conically tapered.

10. A fishing reel according to claim 7, wherein said teeth have an associated pitch and at least one of said pawls is offset with respect to the other pawls in the longitudinal direction of said spindle by an amount equal to half the pitch of said teeth.

11. A fishing reel according to claim 7, wherein rotation of said driving handle causes back and forth cyclical travel of said spindle in its longitudinal direction and displacement of said teeth in the longitudinal direction of said spindle at least, to such an extent that with the aid of said teeth, said pawls are displaced radially outwards and thereby brought into the position for coupling said spool to said spindle.

12. A fishing reel according to claim 2, wherein said release member is located at an outer face of said spool and said push rods are displaceable in a direction away from said outer face.

13. A fishing reel according to claim 1, wherein said releasing means includes a ring-shaped release knob and a pushbutton located concentrically within said release knob, said releasing means further permitting said spool to be detached from said housing upon manual actuation of said pushbutton.

* * * * *